United States Patent
Landry et al.

(10) Patent No.: US 12,158,978 B2
(45) Date of Patent: Dec. 3, 2024

(54) PROTECTION OF DATA PROCESSED BY AN ENCRYPTION ALGORITHM

(71) Applicant: STMICROELECTRONICS (ROUSSET) SAS, Rousset (FR)

(72) Inventors: Simon Landry, Marseilles (FR); Yanis Linge, Fuveau (FR)

(73) Assignee: STMICROELECTRONICS (ROUSSET) SAS, Rousset (FR)

( * ) Notice: Subject to any disclaimer, the term of this patent is extended or adjusted under 35 U.S.C. 154(b) by 251 days.

(21) Appl. No.: 17/850,497

(22) Filed: Jun. 27, 2022

(65) Prior Publication Data
US 2022/0414268 A1 Dec. 29, 2022

(30) Foreign Application Priority Data

Jun. 29, 2021 (FR) ........................................ 2106977

(51) Int. Cl.
G06F 21/72 (2013.01)
H04L 9/00 (2022.01)
H04L 9/06 (2006.01)

(52) U.S. Cl.
CPC .............. *G06F 21/72* (2013.01); *H04L 9/003* (2013.01); *H04L 9/0618* (2013.01); *H04L 9/0631* (2013.01); *H04L 2209/04* (2013.01); *H04L 2209/046* (2013.01)

(58) Field of Classification Search
CPC .......... G06F 21/70; G06F 21/71; G06F 21/72; H04L 9/002; H04L 9/003; H04L 9/06; H04L 9/0618; H04L 9/0631; H04L 2209/04; H04L 2209/046
See application file for complete search history.

(56) References Cited

U.S. PATENT DOCUMENTS

| | | | |
|---|---|---|---|
| 2012/0250854 A1* | 10/2012 | Danger | H04L 9/003 380/28 |
| 2018/0062828 A1* | 3/2018 | Cioranesco | H04L 9/0618 |
| 2021/0150070 A1 | 5/2021 | Satpathy | |

FOREIGN PATENT DOCUMENTS

EP      2637349 A2     9/2013

OTHER PUBLICATIONS

Akkar et al., "An Implementation of DES and AES, Secure against Some Attacks," In Koç et al. (eds.), *Cryptographic Hardware and Embedded Systems—CHES 2001*, vol. 2162 of Lecture Notes in Computer Science, Springer, *Third International Workshop Proceedings*, Paris, France, May 14-16, 2001, pp. 309-318.

Ben-Or et al., "Completeness Theorems for Non-Cryptographic Fault-Tolerant Distributed Computation," *Proceedings of the 20th Annual ACM Symposium on Theory of Computing*, Chicago, Illinois, USA, May 2-4, 1988, pp. 1-10.

(Continued)

*Primary Examiner* — D'Arcy Winston Straub
(74) *Attorney, Agent, or Firm* — Seed IP Law Group LLP

(57) ABSTRACT

The present disclosure relates to a method for protecting a first data item applied to a cryptographic algorithm, executed by a processor, wherein said algorithm is a per-round algorithm, with each round processing contents of first, second and third registers, the content of the second register being masked, during first parity rounds, by the content of a fourth register and the content of the third register being masked, during second parity rounds, by the content of a fifth register.

34 Claims, 5 Drawing Sheets

(56) References Cited

OTHER PUBLICATIONS

Bilgin et al., "Higher-order threshold implementations," vol. 8874 of Lecture Notes in Computer Science, Springer, *Advances in Cryptology—ASIACRYPT 2014—20th International Conference on the Theory and Application of Cryptology and Information Security* Proceedings, Part II, Kaoshiung, Taiwan, R.O.C., Dec. 7-11, 2014, pp. 326-343.
Bilgin et al., "Trade-offs for Threshold Implementations Illustrated on AES," *IEEE Trans. on CAD of Integrated Circuits and Systems* 34(7):1-13, 2015.
Blömer et al., "Provably Secure Masking of AES," vol. 3357 of Lecture Notes in Computer Science, Springer, *Selected Areas in Cryptography, 11th International Workshop, SAC 2004*, Waterloo, Canada, Aug. 9-10, 2004, Revised Selected Papers, pp. 69-83.
Brier et al., "Correlation Power Analysis with a Leakage Model," vol. 3156 of Lecture Notes in Computer Science, Springer, *Cryptographic Hardware and Embedded Systems—CHES 2004*: 6th International Workshop Proceedings, Cambridge, MA, USA, Aug. 11-13, 2004, pp. 16-29.
Carlet et al., "Algebraic Decomposition for Probing Security," Lecture Notes in Computer Science, vol. 9215, Springer, *Advances in Cryptology*, Proceedings of Crypto 2015, pp. 742-763.
Carlet, *Boolean Functions for Cryptography and Coding Theory*, Cambridge University Press, 2021.
Chari et al., "Towards Sound Approaches to Counteract Power-Analysis Attacks," Lecture Notes in Computer Science, vol. 1666, Springer, *Advances in Cryptology*, Proceedings of Crypto 1999, pp. 398-412.
Coron et al., "Fast Evaluation of Polynomials over Binary Finite Fields and Application to Side-Channel Countermeasures*," *J. Cryptographic Engineering* 5(2):73-83, 2015. (20 pages).
Daemen et al., *The Design of Rijndael: AES—The Advanced Encryption Standard*, Springer Verlag, Berlin, Heidelberg, New York, 2002.
Daemen, "Changing of the Guards: A Simple and Effcient Method for Achieving Uniformity in Threshold Sharing," Lecture Notes in Computer Science, vol. 10529, Springer, *Cryptographic Hardware and Embedded Systems—CHES 2017—19th International Conference*, Taipei, Taiwan, Sep. 25-28, 2017, pp. 137-153.
Damgård et al., "Secure Multiparty AES," Lecture Notes in Computer Science, vol. 6052, Springer, *Financial Cryptography and Data Security, 14th International Conference, FC 2010*, Tenerife, Canary Islands, Spain, Jan. 25-28, 2010, pp. 367-374.
De Cnudde et al., "Masking AES with d+1 Shares in Hardware," In Bilgin et al. (eds.), *Proceedings of the ACM Workshop on Theory of Implementation Security, TIS@CCS 2016*, Vienna, Austria, Oct. 24, 2016, ACM, pp. 43.
Fumaroli et al., "Affine Masking against Higher-Order Side Channel Analysis," In Biryukov et al. (eds.), *Selected Areas in Cryptography—17th International Workshop, SAC 2010*, Waterloo, Ontario, Canada, Aug. 12-13, 2010, Revised Selected Papers, vol. 6544 of Lecture Notes in Computer Science, Springer, pp. 262-280, 2010.
Fumaroli et al., "First-Order Differential Power Analysis on the Duplication Method," In Srinathan et al. (eds.), *Progress in Cryptology—Indocrypt 2007, 8th International Conference on Cryptology in India*, Chennai, India, Dec. 9-13, 2007, Proceedings, vol. 4859 of Lecture Notes in Computer Science, Springer, pp. 210-223, 2007.
Genelle et al., "Montgomery's Trick and Fast Implementation of Masked AES," In Nitaj et al. (eds.), *Progress in Cryptology—Africacrypt 2011—4th International Conference on Cryptology in Africa*, Dakar, Senegal, Jul. 5-7, 2011, Proceedings, vol. 6737 of Lecture Notes in Computer Science, Springer, pp. 153-169, 2011.
Genelle et al., "Secure Multiplicative Masking of Power Functions," In Nitaj et al. (eds.), *Progress in Cryptology—Africacrypt 2011—4th International Conference on Cryptology in Africa*, Dakar, Senegal, Jul. 5-7, 2011, Proceedings, vol. 6737 of Lecture Notes in Computer Science, Springer, pp. 200-217, 2011.
Genelle et al., "Thwarting Higher-Order Side Channel Analysis with Additive and Multiplicative Maskings," In Preneel et al. (eds.), *CHES 2011*, LNCS 6917, IACR, pp. 240-255, 2011.
Golic et al., "Multiplicative Masking and Power Analysis of AES," In Kalisk et al. (eds.), Cryptographic Hardware and Embedded Systems—CHES 2002, 4th International Workshop, Redwood Shores, CA, USA, Aug. 13-15, 2002, Revised Papers, vol. 2523 of Lecture Notes in Computer Science, Springer, pp. 198-212, 2003.
Goubin et al., "DES and Differential Power Analysis (The "Duplication" Method)," In Koç et al. (eds.), *Cryptographic Hardware and Embedded Systems, First International Workshop, CHES'99*, Worcester, MA, USA, Aug. 12-13, 1999, Proceedings, vol. 1717 of Lecture Notes in Computer Science, Springer, pp. 158-172, 1999.
Gross et al., "An Effcient Side-Channel Protected AES Implementation with Arbitrary Protection Order," In Handschuh, (ed.), *Topics in Cryptology—CT-RSA 2017—The Cryptographers' Track at the RSA Conference 2017*, San Francisco, CA, USA, Feb. 14-17, 2017, Proceedings, vol. 10159 of Lecture Notes in Computer Science, Springer, pp. 95-112, 2017.
Ishai et al., "Private Circuits: Securing Hardware against Probing Attacks," In Boneh, (ed.), *Advances in Cryptology—Crypto 2003, 23rd Annual International Cryptology Conference*, Santa Barbara, California, USA, Aug. 17-21, 2003, Proceedings, vol. 2729 of Lecture Notes in Computer Science, Springer, pp. 463-481, 2003.
Kocher et al., "Differential Power Analysis," In Wiener (ed.), *Advances in Cryptology—Crypto '99, 19th Annual International Cryptology Conference*, Santa Barbara, California, USA, Aug. 15-19, 1999, Proceedings, vol. 1666 of Lecture Notes in Computer Science, Springer, 1999, pp. 388-397.
Mangard et al., "Side-Channel Leakage of Masked CMOS Gates," In Menezes (ed.), *Topics in Cryptology—CT-RSA 2005, The Cryptographers' Track at the RSA Conference 2005*, San Francisco, CA, USA, Feb. 14-18, 2005, Proceedings, vol. 3376 of Lecture Notes in Computer Science, Springer, pp. 351-365, 2005.
Mangard et al., "Successfully Attacking Masked AES Hardware Implementations," In Rao et al. (eds.), *Cryptographic Hardware and Embedded Systems—CHES 2005, 7th International Workshop*, Edinburgh, UK, Aug. 29-Sep. 1, 2005, Proceedings, vol. 3659 of Lecture Notes in Computer Science, Springer, pp. 157-171, 2005.
Micali et al., "Physically Observable Cryptography," In Naor (ed.), *Theory of Cryptography, First Theory of Cryptography Conference, TCC 2004*, Cambridge, MA, USA, Feb. 19-21, 2004, Proceedings, vol. 2951 of Lecture Notes in Computer Science, Springer, pp. 278-296, 2004.
Moradi et al., "Pushing the Limits: A Very Compact and a Threshold Implementation of AES," In Paterson, (ed.), *Advances in Cryptology—Eurocrypt 2011—30th Annual International Conference on the Theory and Applications of Cryptographic Techniques*, Tallinn, Estonia, May 15-19, 2011, Proceedings, vol. 6632 of Lecture Notes in Computer Science, Springer, pp. 69-88, 2011.
Nikova et al., "Secure Hardware Implementation of Nonlinear Functions in the Presence of Glitches," *J. Cryptol.* 24::292-321, 2011.
Nitaj et al. (eds.), *Progress in Cryptology—Africacrypt 2011—4th International Conference on Cryptology in Africa*, Dakar, Senegal, Jul. 5-7, 2011, Proceedings, vol. 6737 of Lecture Notes in Computer Science, Springer, 2011. (397 pages).
Rao et al. (eds.), "Cryptographic Hardware and Embedded Systems—CHES 2005," *7th International Workshop*, Edinburgh, UK, Aug. 29-Sep. 1, 2005, Proceedings, vol. 3659 of Lecture Notes in Computer Science. Springer, 2005, 469 pages.
Rivain et al., "Block Ciphers Implementations Provably Secure Against Second Order Side Channel Analysis," In Nyberg, (ed.), *Fast Software Encryption, 15th International Workshop, FSE 2008*, Lausanne, Switzerland, Feb. 10-13, 2008, Revised Selected Papers, vol. 5086 of Lecture Notes in Computer Science, Springer, pp. 127-143, 2008.
Rivain et al., "Provably Secure Higher-Order Masking of AES," In Mangard et al. (eds.), *Cryptographic Hardware and Embedded Systems, CHES 2010, 12th International Workshop*, Santa Barbara, CA, USA, Aug. 17-20, 2010, Proceedings, vol. 6225 of Lecture Notes in Computer Science, Springer, pp. 413-427, 2010.

(56) References Cited

OTHER PUBLICATIONS

Rivest et al., "How to Leak a Secret," In Boyd, (ed.), *Advances in Cryptology—Asiacrypt 2001, 7th International Conference on the Theory and Application of Cryptology and Information Security*, Gold Coast, Australia, Dec. 9-13, 2001, Proceedings, vol. 2248 of Lecture Notes in Computer Science, Springer, pp. 552-565, 2001.
Roche et al., "Higher-Order Glitches Free Implementation of the AES using Secure Multi-Party Computation Protocols," *J. Cryptographic Engineering* 2(2):111-127, 2012. (36 pages).
Sugawara, "3-Share Threshold Implementation of AES S-box without Fresh Randomness," *IACR Trans. Cryptogr. Hardw. Embed. Syst.* 2019(1):123-145, 2019.
Suzuki et al., "DPA Leakage Models for CMOS Logic Circuits," In Rao et al. (eds.), *Cryptographic Hardware and Embedded Systems—CHES 2005, 7th International Workshop*, Edinburgh, UK, Aug. 29-Sep. 1, 2005, Proceedings, vol. 3659 of Lecture Notes in Computer Science, Springer, pp. 366-382, 2005.
Vadnala et al., "Algorithms for Switching Between Boolean and Arithmetic Masking of Second Order," In Gierlichs et al. (eds.), *Security, Privacy, and Applied Cryptography Engineering—Third International Conference, Space 2013*, Kharagpur, India, Oct. 19-23, 2013, Proceedings, vol. 8204 of Lecture Notes in Computer Science, Springer, pp. 95-110, 2013. (16 pages).
Wei et al., "New second-order threshold implementation of AES," *IET Inf. Secur.*, 13(2):117-124, 2019.
Wiener et al. (eds.), "Advances in Cryptology—Crypto '99," *19th Annual International Cryptology Conference*, Santa Barbara, California, USA, Aug. 15-19, 1999, Proceedings, vol. 1666 of Lecture Notes in Computer Science. Springer, 1999.
Yao, "How to Generate and Exchange Secrets," In *27th Annual Symposium on Foundations of Computer Science*, Toronto, Canada, Oct. 27-29, 1986, IEEE Computer Society, pp. 162-167, 1986.

\* cited by examiner

PROTECTION OF DATA PROCESSED BY AN ENCRYPTION ALGORITHM

BACKGROUND

Technical Field

The present disclosure relates to data protection in general and, more particularly, to data encryption processing by a block encryption algorithm.

Description of the Related Art

A block encryption algorithm is executed in successive rounds. In each round, encryption operations are performed on data blocks to be encrypted. The encryption operations also depend on an encryption key, itself depending on its place in the round.

However, block encryption algorithms are sensitive to side-channel attacks. These attacks consist of exploiting information such as an algorithm calculation or execution time by a processor, a power consumption of the electronic device in which the algorithm is executed. The attacker then deduces the value of at least part of the data used by the algorithm (such as an encryption key, for example). A countermeasure to this type of attack consists of masking the input data processed by the algorithm.

BRIEF SUMMARY

In an embodiment, a method comprises: executing, using cryptographic circuitry, a cryptographic operation; and protecting, using the cryptographic circuitry, a first data item applied to the cryptographic operation during the executing. The executing and protecting includes: executing the cryptographic operation in a plurality of rounds, each round processing contents of first, second and third registers; masking content of the second register using content of a fourth register during first parity rounds of the plurality of rounds; and masking content of the third register using content of a fifth register during second parity rounds of the plurality of rounds.

In an embodiment, a device comprises: a plurality of registers; and cryptographic circuitry coupled to the plurality of registers, wherein the cryptographic circuitry, in operation: executes a cryptographic operation; and protects a first data item during the executing of the cryptographic operation. The executing and protecting includes: executing the cryptographic operation in a plurality of rounds, each round processing contents of first, second and third registers of the plurality of registers; masking content of the second register using content of a fourth register of the plurality of registers during first parity rounds of the plurality of rounds; and masking content of the third register using content of a fifth register of the plurality of registers during second parity rounds of the plurality of rounds.

In an embodiment, a system comprises: a memory; and cryptographic circuitry coupled to the memory and including a plurality of registers, wherein the cryptographic circuitry, in operation: executes a cryptographic operation; and protects a first data item during the executing of the cryptographic operation. The executing and protecting includes: executing the cryptographic operation in a plurality of rounds, each round processing contents of first, second and third registers of the plurality of registers; masking content of the second register using content of a fourth register of the plurality of registers during first parity rounds of the plurality of rounds; and masking content of the third register using content of a fifth register of the plurality of registers during second parity rounds of the plurality of rounds.

In an embodiment, a non-transitory computer-readable medium has contents which cause cryptographic circuitry to perform a method, the method comprising: executing a cryptographic operation; and protecting a first data item during the executing of the cryptographic operation, wherein the executing and protecting includes: executing the cryptographic operation in a plurality of rounds, each round processing contents of first, second and third registers; masking content of the second register using content of a fourth register during first parity rounds of the plurality of rounds; and masking content of the third register using content of a fifth register during second parity rounds of the plurality of rounds.

BRIEF DESCRIPTION OF THE SEVERAL VIEWS OF THE DRAWINGS

The foregoing features and advantages, as well as others, will be described in detail in the following description of specific embodiments given by way of illustration and not limitation with reference to the accompanying drawings, in which.

DETAILED DESCRIPTION

Like features have been designated by like references in the various Figures. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail. In particular, the electronic circuits (processors, memories, or state machines) adapted to the embodiment have not been detailed. The embodiments described are compatible with the use of usual electronic circuits.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front," "back," "top," "bottom," "left," "right," etc., or to relative positional qualifiers, such as the terms "above," "below," "higher," "lower," etc., or to qualifiers of orientation, such as "horizontal," "vertical," etc., reference is made to the orientation shown in the Figures.

Unless specified otherwise, the expressions "around," "approximately," "substantially" and "in the order of" signify within 10%, and within 5%.

Figure 1:
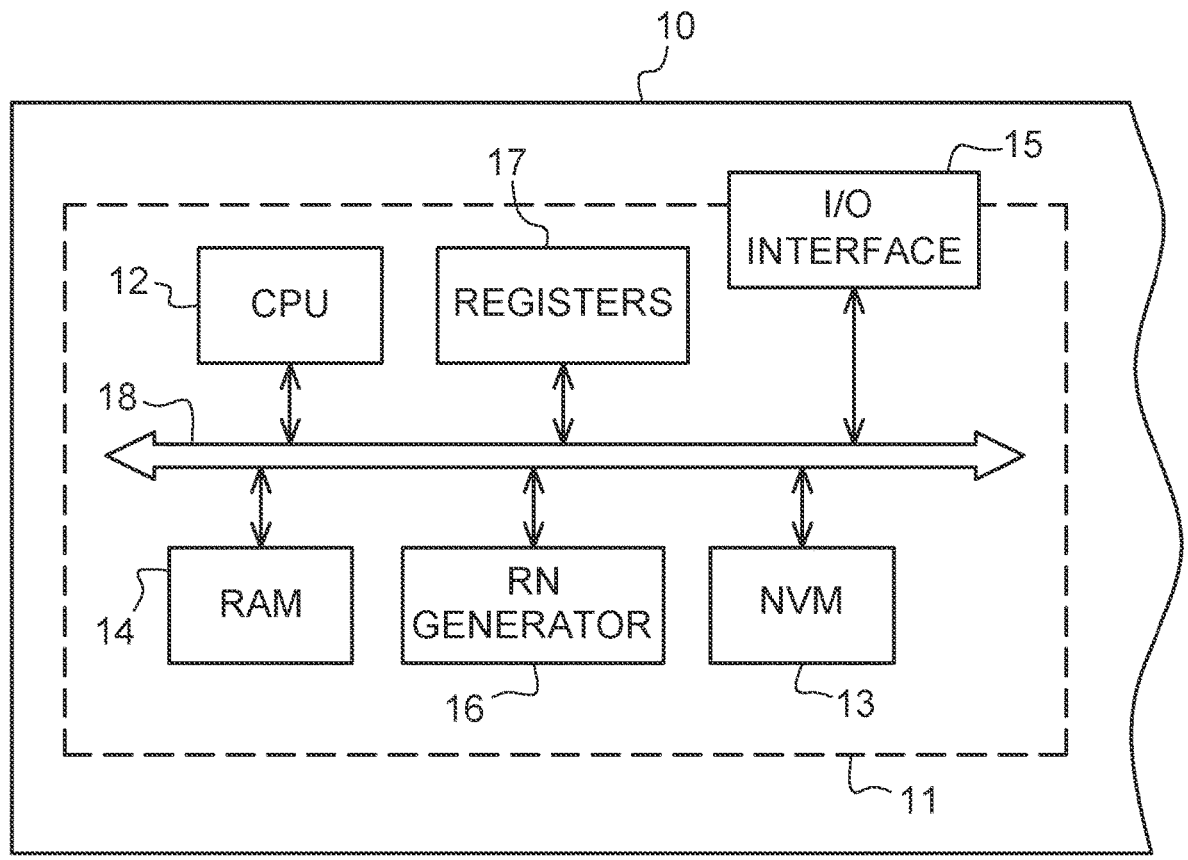
FIG. 1 shows an example of an electronic device of the type to which the described embodiments may apply.

FIG. 1 shows an example electronic device 10 of the type to which the described embodiments may apply.

The electronic device 10 comprises an integrated circuit 11.

The circuit 11 comprises a processor 12 (CPU), for example, coupled to one or more volatile or non-volatile memories such as a volatile memory 14 (RAM) and a non-volatile memory 13 (NVM), such as a flash memory, via one or more address-, data- and/or command buses 18. The processor 12 also operates other memorization elements, and, in particular, registers (block 17, REGISTERS). The bus 18 also connects the internal circuits of the circuit 11 to an input/output interface 15 (I/O INTERFACE) and to one or more random number generators 16 (RN GENERATOR) in the intended application. Other functions (not shown) may be implemented by the circuit 11.

The processor 12 is configured to execute an encryption algorithm described by instruction codes, stored in the non-volatile memory 13, for example.

The random number generator 16 is a pseudo-random number generator, such as a linear congruential generator, that uses recursive arithmetic sequences having a disordered behavior and having a period long enough to appear random. The quality of such a generator depends on the arithmetic parameters used, in particular. According to another embodiment, the generator 16 is a random number generator that uses a random physical source, based on intrinsic properties of the material on which it is implemented, for example.

According to the described embodiments, data stored in the volatile memory 14, for example, is intended to be encrypted by the encryption algorithm. The algorithm is a block symmetric encryption algorithm, such as an advanced encryption standard (AES) type of algorithm, or an SM4 type of algorithm derived from the SMS4 algorithm (from the initials SM, for the Chinese, Shangyé Mima, meaning "Commercial Cipher" in English).

When encrypting using a block algorithm, the data to be encrypted is divided into blocks of bits of the same size, such as blocks of 128 bits for AES or SM4. The algorithm then performs a succession of rounds, each round applying a so-called confusion step, using a substitution box (SBOX). The substitution box is composed of one inversion operation and at least one linear operation. The algorithm then performs a diffusion step consisting of linear operations. At each algorithm round, a sub-key, derived from a single encryption key, stored in the non-volatile memory 13 of the circuit 11, for example, is used. Since the algorithm is symmetrical, the single encryption key makes it possible to encryption as well as decrypt the data.

Block encryptions are sensitive to side-channel attacks. Side-channel attacks extract data from the circuit 11, via the interface 15, for example, by interpreting information such as power consumption, calculation time or electromagnetic radiation. By way of example, such an attack may include correlating the power consumption of the integrated circuit executing the algorithm with the results of calculations involving the encryption key used by this algorithm.

A countermeasure to this type of attack may include masking the data to be encrypted by adding or multiplying it with random data (a mask), for example, generated by the random number generator 16. Thus, the data is never handled by the encryption algorithm alone. Nevertheless, if the attacker performs a second-order attack, e.g., combines two current consumption measurements, observed on the circuit during execution of the cryptographic algorithm, the attacker may recover the masked data as well as the mask. It is then possible for him to "unmask" the sensitive data (not wished to be made visible). Moreover, if not controlled, the transient state of the circuit may contain intermediate states of the data processing by the algorithm, making it possible for an attacker to deduce the value of the said data. This phenomenon is called a "glitch".

The described embodiments provide a new countermeasure to second-order side-channel attacks.

Figure 2A:
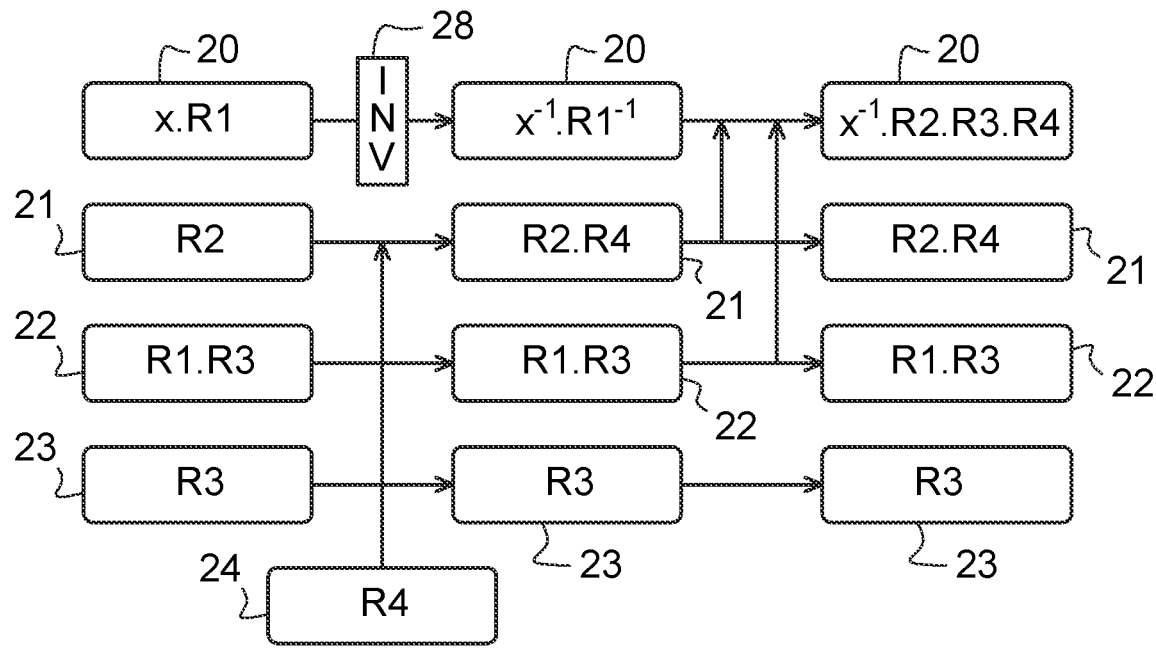
FIG. 2A shows an example illustrating one embodiment of the described method schematically and in block form.
Figure 2B:
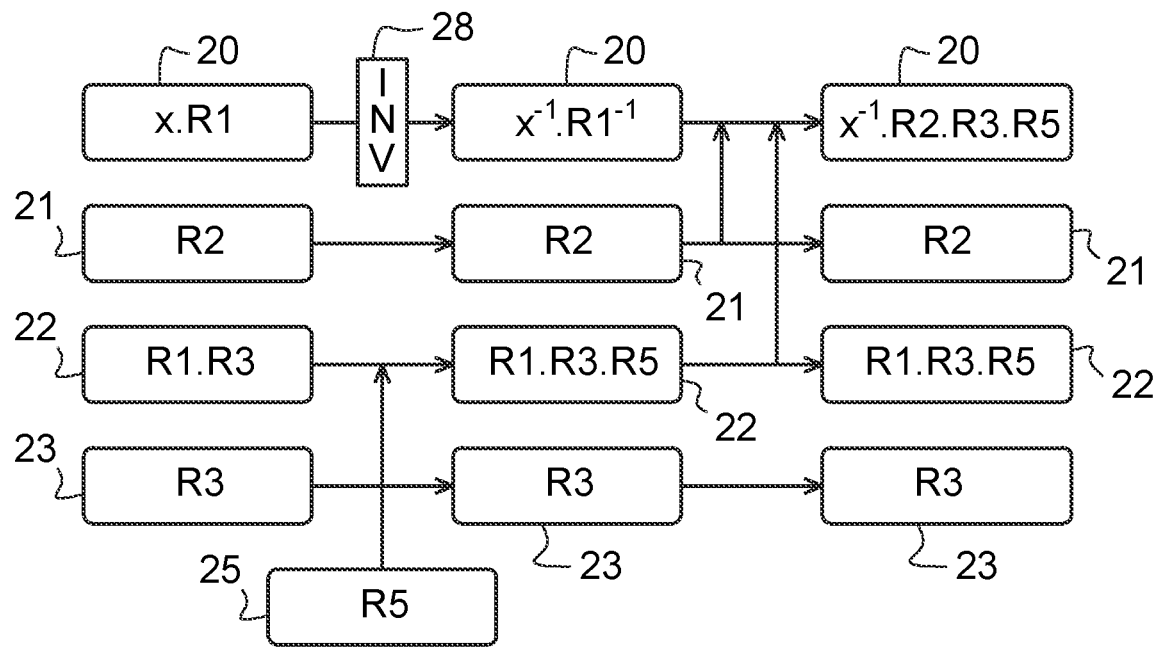
FIG. 2B shows another example illustrating one embodiment of the method described schematically and in block form.
Figure 3:
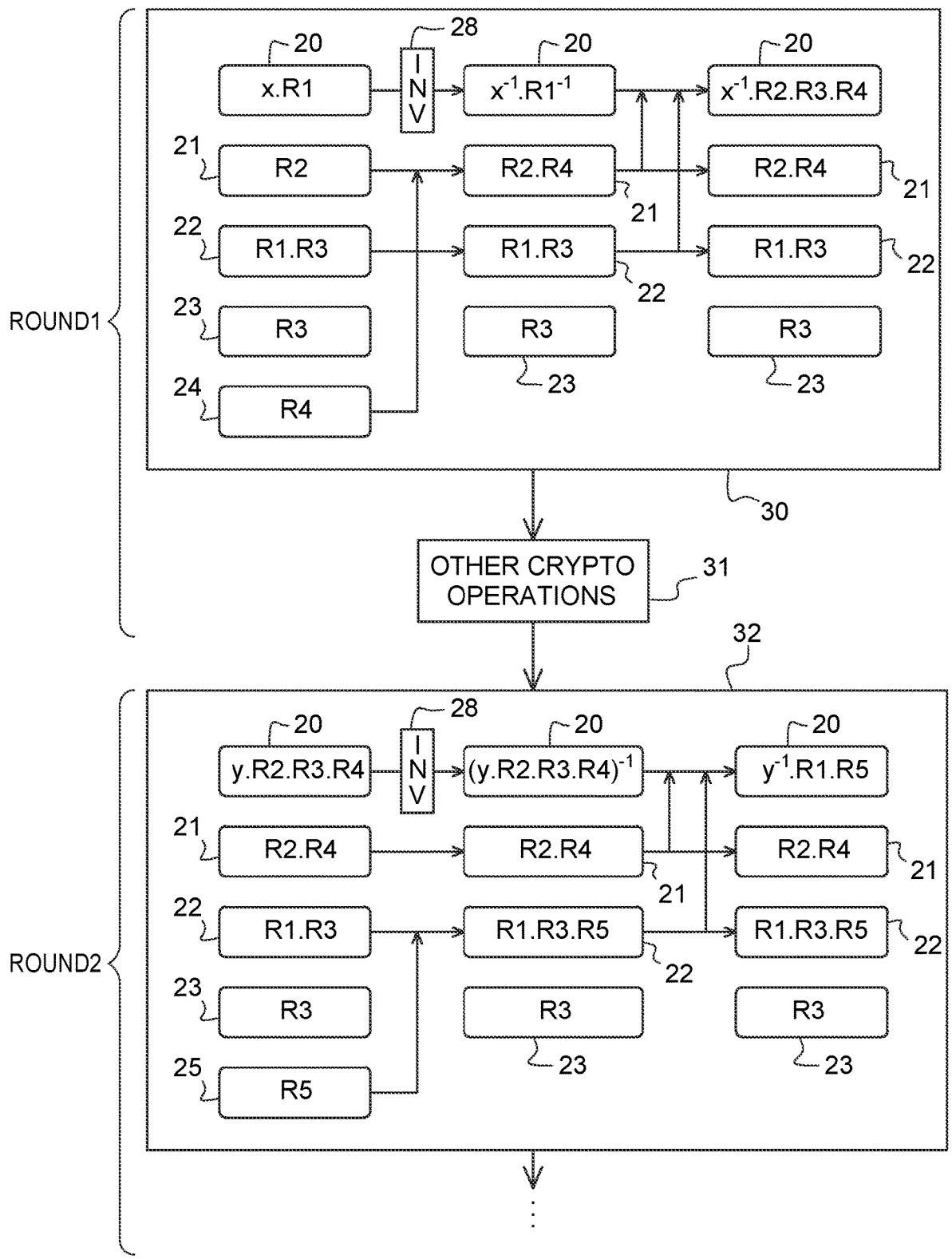
FIG. 3 is a flowchart showing the steps of one embodiment of the described method.

FIGS. 2A, 2B and 3 show block, symbolizing registers of the circuit 11 whose content is overwritten and replaced by new content at each step that occurs on the register content.

FIG. 2A shows an example illustrating an embodiment of the described method, schematically and in the form of blocks.

FIG. 2A illustrates an example of part of one round of an encryption algorithm according to one embodiment. A word or code x, constituting the data to be encrypted or plain text, is processed for encryption by the algorithm. The word or code x contains a given number of bits, such as 128 bits in the case of AES-type algorithms.

In order to prevent the plain text from being recovered during a side-channel attack, it is masked by a first mask R1 before the algorithm is executed. By way of example, the first mask R1 is a 128-bit random value generated by the generator 16.

A first input data item x. $R_1$ of the algorithm corresponding to the word x multiplied, modulo an irreducible polynomial P, by the first mask R1, is stored in a first register 20. By way of example, when the algorithm executed is of the AES type, the polynomial P considered is the so-called Rijndael polynomial and is defined by $$P[X]=X^8+X^4+X^3+X+1.\qquad\text{Math 1}$$

The algorithm never handles the word x alone. Nevertheless, if the algorithm handles the first mask R1, a second order attack on the first input data x.R1 and on the first mask R1 makes it possible for the attacker to recover the word x.

According to one embodiment, a second input data item, stored in a second register 21, represents a second mask R2. A third input data item R1.R3, showing the first mask R1 masked by a third mask R3, is stored in a third register 22. The second and third inputs are 128-bit random values generated by the generator 16 upstream of the algorithm execution, for example. The third mask R3 is stored in a register 23.

Thus, the algorithm does not handle the first mask R1 "alone".

By way of example, the value of the first mask R1 is sent directly to the processor 12 after generation by the generator 16 and via the bus 18, to mask the plain text x without being stored in any memory of the circuit 11. This avoids carrying the mask R1 in the circuit 11.

In order to recover the plain text x, the attacker must combine the first and third input data x.R1 and R1.R3 as well as the third mask R3. A second-order attack is then insufficient to recover the plain text x.

Once the first, second, and third input data items x.R1, R2, and R1.R3 are provided to the algorithm, a step 28 (INV) of the algorithm round consists of inverting, modulo the considered polynomial, the first input data item x.R1 into a finite field of the power $2^n$, where n represents the power of the polynomial P. The inverse of the first input data item x.R1 by applying the step 28 constitutes a data item $(x.R1)^{-1}=x^{-1}.R1^{-1}$ and is stored in the register 20, overwriting the first input data item x.R1, which is then no longer present in the circuit 11.

In another step, the generator 16 generates a fourth mask R4, which is stored in a register 24. According to one embodiment, a data item R2.R4 is obtained by masking the second input data R2 by the fourth mask R4 and is stored in the register 21, overwriting the second input data R2.

Following step 28 and obtaining the data R2.R4, a first intermediate data item $x^{-1}.R2.R3.R4$ is obtained by masking the data $x^{-1}.R1^{-1}$ by the data R2.R4 and by the data R1.R3. The first intermediate data item $x^{-1}.R2.R3.R4$ is stored in the register 20, overwriting the data $x^{-1}.R1^{-1}$.

The data R2.R4 contained in the register 21 constitutes second intermediate data. The contents of the registers 22 and 23 (thus the third input data R1.R3 and the third mask R3) are not modified. A third intermediate data item corresponds to the third input data R1.R3.

Figure 4:
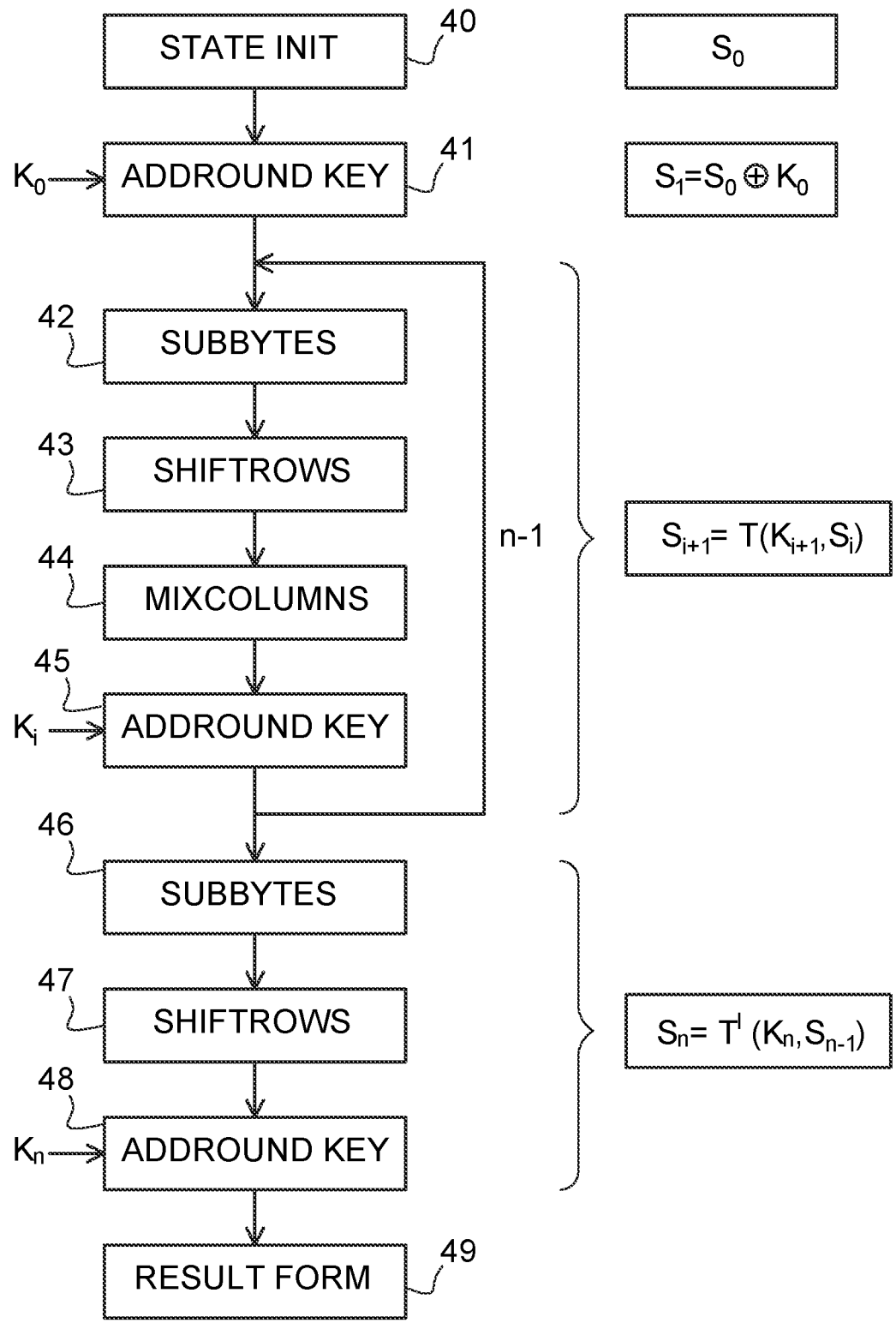
FIG. 4 is a block diagram illustrating one example of an encryption algorithm of the type to which the described embodiments may apply.
Figure 5:
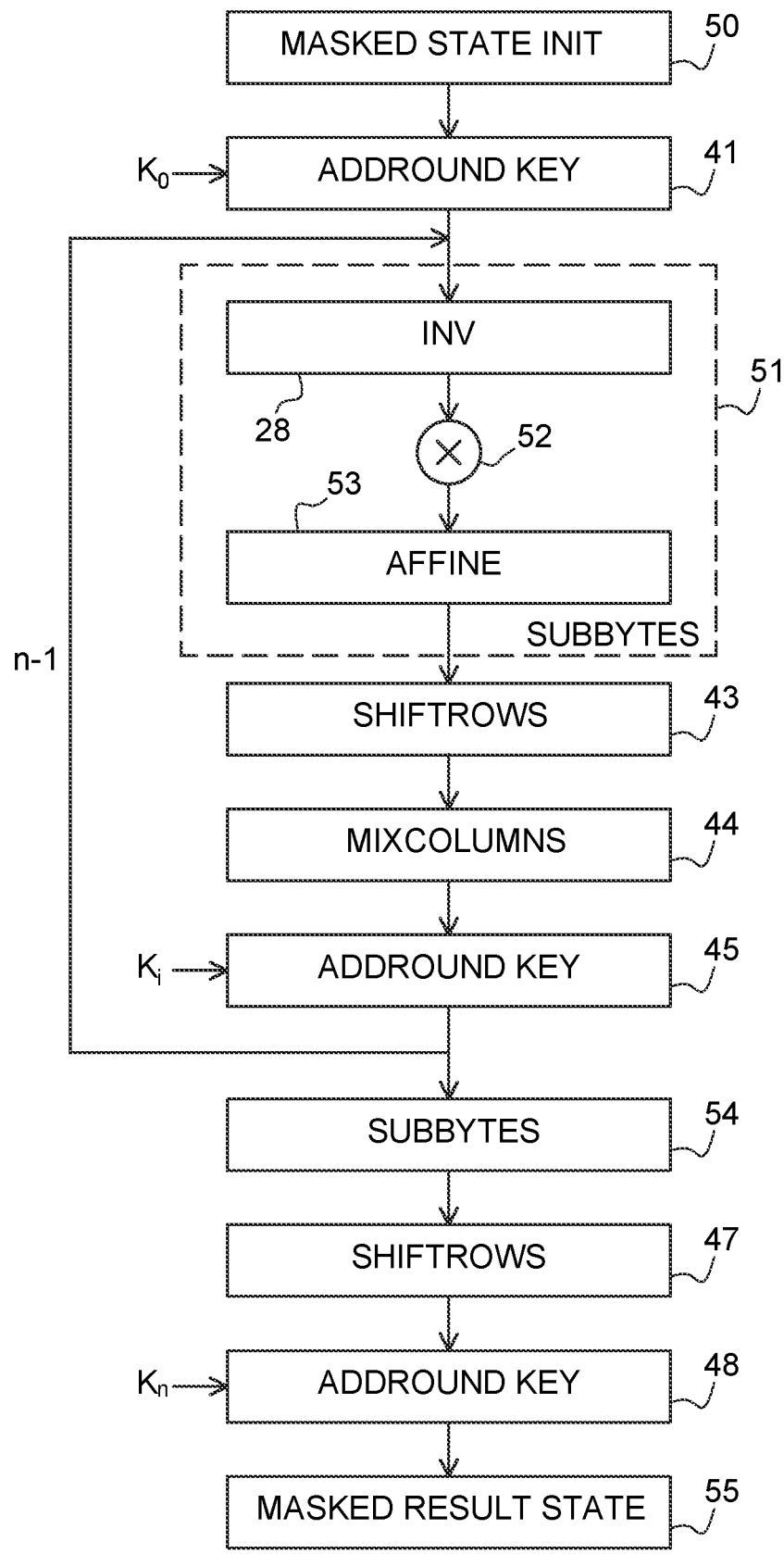
FIG. 5 is a block diagram illustrating one example of the application of the embodiments described, by the algorithm illustrated in FIG. 4.

The first intermediate data item $x^{-1}.R2.R3.R4$ constitutes the input data for other encryption algorithm steps that will be detailed in FIGS. 4 and 5. The second and third intermediate data items R2.R4 and R1.R3, as well as the mask R3, remain stored in the registers 21, 22 and 23, for subsequent unmasking of the encrypted text, for example.

FIG. 2B shows another example, illustrating an embodiment of the described method, schematically and in block form.

The embodiment illustrated in FIG. 2B is similar to that of FIG. 2A, except that the fourth mask R4 is replaced by a fifth mask R5 stored in a register 25. The fifth mask R5 is applied to the third input data R1.R3 and no longer to the second input data R2. A data item R1.R3.R5 is then obtained and is stored in the register 22, overwriting the third input data R1.R3. A first intermediate data item $x^{-1}.R2.R3.R5$ is obtained by masking the data $x^{-1}R1^{-1}$ contained in the register 20 by the second input data R2 and by the data R1.R3.R5. The first intermediate data item $x^{-1}.R2.R3.R5$ is stored in the register 20, overwriting the data $x^{-1}R1^{-1}$.

In this embodiment, the content of the register 21 (thus the second input data R2) are not modified, with the second data R2 constituting a second intermediate data item. The data R1.R3.R5 constitutes a third intermediate data item.

As in FIG. 2B, the first intermediate data $x^{-1}.R2.R3.R5$ constitutes the input data for other encryption algorithm steps that will be detailed in FIGS. 4 and 5. The second and third intermediate data R2 and R1.R3.R5, as well as the third mask R3, remain stored in corresponding registers, for subsequent unmasking of the encrypted text.

By way of example, the first algorithm round is conventionally ranked 1 (or, more generally, ranked odd), then, during execution of the encryption algorithm by rounds, the embodiment illustrated by FIG. 2A is applied during the rounds ranked odd and the embodiment illustrated by FIG. 2B is applied during those ranked even. For each odd-ranked round, a mask R4 is generated by the generator 16 and is stored in the register 24, for example, and then used to mask the second input data of the round. For each even-ranked round, another mask R5 is generated by the generator 16 and is stored in the register 25 and then used to mask the third input data of the round.

In the case where the first round of the algorithm is conventionally ranked 0 (or, more generally, ranked even), the embodiment shown in FIG. 2A is applied during even-ranked rounds and the embodiment shown in FIG. 2B is applied during odd-ranked rounds.

FIG. 3 is a flowchart showing steps of one embodiment of the method described.

FIG. 3 is described with the first round of the algorithm conventionally being ranked odd.

A first round (ROUND1) of the encryption algorithm starts in a step 30, for example. The step 30 follows the embodiment shown in FIG. 2A concerning the contents of the registers 20, 21 and 22. The register 20 contains a data item x.R1. The register 21 contains a data item R2. The register 22 contains a data item R1.R3. During the first round, a mask R4 is generated by the generator 16 and is stored in the register 24. Following the embodiment shown in FIG. 2A, the registers 20, 21, and 22 (right column of block 30 in FIG. 3) contain data $x^{-1}.R2.R3.R4$, R2.R4, and R1.R3 respectively.

In a step 31 (OTHER CRYPTO OPERATIONS), subsequent to step 30, cryptographic operations specific to the encryption algorithm used are applied to the contents of the register 20, which are then overwritten with a data item y.R2.R3.R4.

A second round (ROUND2) of the algorithm starts in a step 32, for example, subsequent to step 31. The step 32 follows the embodiment shown in FIG. 2B. However, the input data of this round corresponds to the current contents of registers 20, 21, 22 and 23, the quantities y.R2.R3.R4, R2.R4, R1.R3 and R3.

The data y.R2.R3.R4 is then inverted, in one embodiment of step 28, and a data item $(y.R2.R3.R4)^{-1}$ is stored in the register 20, overwriting the data y.R2.R3.R4.

A fifth mask R5 is generated by the random number generator 16 and is stored in the register 25. The fifth mask R5 is used to mask the contents of the register 22 (R1.R3) to obtain a data item R1.R3.R5. The data R1.R3.R5 is stored in the register 22, overwriting the data R1.R3 that had then been stored there.

The contents of the registers 21 and 22 are then used to mask the contents of the register 20 $((y.R2.R3.R4)^{-1})$. A data item $y^{-1}.R1.R5$ is thus obtained and stored in the register 20, overwriting the data $(y.R2.R3.R4)^{-1}$. The contents of the register 20 no longer depend on the fourth mask R4 generated during the first round of the algorithm.

The second round of the algorithm continues with the step 31 performing again on the contents of the register 20, for example.

In the case where a third algorithm round takes place, a new value of the mask R4 generated by the generator 16 is stored in the register 24, which overwrites the previous value. This new value is used to mask the contents of the register 21, for example, in the manner described in connection with FIG. 2A or with block 30.

According to one embodiment, the values generated by the generator 16 are used in alternating rounds to mask either the contents of the register 21 or the contents of the register 22.

According to one embodiment, content (R3) of the register 23 remains the same during the entire course of the algorithm.

According to an embodiment, the algorithm performs a plurality of turns, and following a last turn, the register 20 furnishes a masked result y. The mask depends on the parity of the last turn and either is a multiplicative combination of the content of the register 21 with the mask R3 or a multiplicative combination of the content of register 22 with the inverse value of the mask R3. In order to obtain the value of the result y, the content of the register 20 is demasked. The demasking is performed by a multiplicative combination of the content of the register 20, either with the inverse values of the contents of the registers 21 and 23, or with the inverse value of the content of the register 22 and the content of the register 23. The multiplicative combination which allows the demasking depends on the parity of the last turn.

FIG. 4 is a block diagram illustrating an example of an encryption algorithm of the type to which the described embodiments apply.

More particularly, FIG. 4 illustrates the main steps of an AES-type algorithm, by means of a simplified flowchart. Only the encryption will be described, with the decryption using the inverse transformations. For more details, reference may be made to the book "The Design of Rijndael" by Joan Daemen and Vincent Rijmen, published by Springer-Verlag (ISBN 3-540-42580-2) and to the AES standard (FIPS PUB 197).

This algorithm encrypts a plain text $S_0$ of a determined number of bits (128 bits) into encrypted text $S_n$ of the same size. The encryption and decryption are based on a secret key whose length (128, 192 or 256 bits) determines the number of algorithm rounds (10, 12 or 14 rounds respectively).

According to one embodiment, an AES type algorithm is applied to 128-bit plain text chopped into bytes, which corresponds to the most frequent case.

In practice, each step of an AES type of algorithm processes an array of four rows and four columns, representing a word, each element of which is a byte. To simplify the following description, one will refer to a state considered as being an array, for each step.

For implementation of the encryption or decryption algorithm, from the 128, 192 or 256-bit secret key, n sub-keys are produced, comprising 128 bits, with n being equal to 11, 13 or 15, depending on the size of the secret key. Each sub-key is intended to be used by the algorithm during a round.

The method starts at an initial state (block 40, STATE INIT) $S_0$ of the plain text.

A first phase of the encryption method is an operation (block 41, ADDROUNDKEY) consisting of making an Exclusive OR (XOR) combination of the initial state $S_0$ with a first sub-key $K_0$. A first intermediate state $S_1$ is obtained.

A second phase of the encryption method consists of performing several rounds of the same transformation T, involving, at each round, the state $S_{i-1}$ obtained in the previous round and a current sub-key $K_i$. The number of rounds of transformation T corresponds to n−1, to the number n+1 of derived sub-keys, decreased by 2.

Each round of transformation T consists of four operations, applied successively.

A first operation (block 42, SUBBYTES) of the round transformation T constitutes a non-linear transformation, in which each byte of the array constituting the current state is replaced by its image, generally taken from a substitution box (SBOX), precomputed or computed dynamically. The substitution box SBOX is obtained by two combined transformations, for example. A first transformation (block 28 FIGS. 2A and 2B, INV) consists of inverting the byte considered in the finite field of the power of $2^8$ modulo the irreducible polynomial P, with the byte 00 constituting its own image. This inversion is followed by an affine transformation, for example.

A second operation (block 43, SHIFTROWS) consists of rotating the last three array rows. The first array row remains unchanged. The second row undergoes a one-byte rotation. The third row undergoes a two-byte rotation. The fourth row undergoes a three-byte rotation.

According to some embodiments, the second operation may be performed before the first operation.

A third operation (block 44, MIXCOLUMNS) of the round transformation T consists of considering each array column from the first and second operations as a polynomial of four terms, and multiplying each of these polynomials by a polynomial M modulo another polynomial Q.

A fourth and final operation (block 45, ADDROUND-KEY) of the round transformation T of place i consists of applying the sub-key $K_i$ to the array resulting from the previous operations. Each array byte is combined by an Exclusive OR to the sub-key $K_i$. This operation 45 is the same as the operation 41 of the first encryption phase, but performed with a different sub-key.

At the end of the operation 45, a state $S_{i+1}=T(K_{i+1}, S_i)$ is obtained for a place i round. The four operations of the round transformation T are repeated n−1 times, after the operation 45, we return to the operation 42 to perform a round again with the next sub-key.

The third phase of the AES encryption algorithm consists of repeating the round transformation operations except for the third one (block 44, MIXCOLUMNS). In FIG. 4, this latter round is illustrated by the blocks 46, 47 and 48 repeating the operations of the blocks 42, 43 and 45 described previously, with the last sub-key $K_n$ as the key for the operation 48.

The state $S_n=T'(K_n, S_{n-1})$ is then obtained. If necessary, this result is formatted (block 49, RESULT FORM) for later use.

FIG. 5 is a block diagram illustrating an example of the application of the embodiments described by the algorithm illustrated in FIG. 4.

FIG. 5 is described with the ranking of the first round of the algorithm conventionally being odd.

Specifically, FIG. 5 illustrates the implementation of the method described in FIGS. 2A, 2B, and 3 in an AES type of algorithm.

The method starts at an initial state (block 50, MASKED STATE INIT) in which the content of the register 20 is masked plain text, e.g., the data item x.R1. The registers 21, 22, and 23 contain the data R2, R1.R3, and R3, respectively, for example. By way of example, the data contained in the registers 20, 21, 22 and 23 are 128 bits.

According to one embodiment, the content of the registers 20, 21, 22 and 23 are divided into bytes constituting an array of four rows and four columns. To simplify the following description, one will refer to a state considered as being an array, for each step.

A first phase of the encryption method is the operation (block 41, ADDROUND KEY) of making an Exclusive OR (XOR) combination of the content of the register 20, such as the first input data x.R1, with the first sub-key K0. This new data is stored in the register 20, overwriting the previous content.

When executing a usual AES type of algorithm as described in connection with FIG. 4, the first round starts with a second non-linear operation (block 51, SUBBYTES), in which each byte of the current state array is replaced by its image, generally taken from a substitution box (SBOX). The substitution box SBOX can generally be obtained by two transformations combined. For an AES type of algorithm, the first transformation 28 (INV) consists of inverting the bytes considered (the elements of the array of the current state contained in the register 20) in the finite field of the power of $2^8$ modulo the Rijndael polynomial P. This inversion is followed by an affine transformation (block 53, AFFINE).

According to the embodiments described here, an intermediate step 52 is performed subsequent to the operation 28 and prior to the affine transformation. The step 52 consists of the generator 16 generating a mask (R4 or R5), stored during this first round in the register 24, for example, and this mask masking the contents of the register 21. The step 52 then consists of masking the previously inverted bytes contained in the register 20 with the contents of the registers 21 and 22. At this stage of the first round, the register 20 then contains a data item $x^{-1}.R2.R3.R4$, for example. The affine transformation 53 is then performed on the contents of the register 20.

The usual method for a round of the AES type of algorithm resumes on the contents of the register 20. In other words, the transformations 43, 44 and 45 are applied, in this order, to the contents of the register 20, in order to obtain a data item y.R2.R3.R4, for example.

By way of example, when the first algorithm round ends, the register 20 contains the data y.R2.R3.R4, the register 21 contains the data R2.R4 and the register 22 contains the data R1.R3. The registers 23 and 24 contain the masks R3 and R4, respectively.

The algorithm resumes at the step 51. When the second-round step 52 is performed, a new mask generated by the generator 16 is stored in the register 25, for example, and is used to mask the contents of the register 22.

The algorithm continues in a succession of n−1 rounds comprising the operations 51, 43, 44 and 45, in that order. Each time the step 52 is performed during a round ranked odd, a new random value, generated by the generator 16, is stored in the register 24 and is used to mask the contents of the register 21. Each time the step 52 is performed during a round ranked even, a new random value, generated by the generator 16, is stored in the register 25 and is used to mask the contents of the register 22.

Once the $(n-1)^{th}$ round has been completed, the algorithm continues in an operation 54 (SUBBYTES), identical in terms of operation with the operation 51. The operations 47 and 48 follow the operation 54.

The register 20 then contains a masked final state (block 55, MASKED FINAL STATE). To obtain the unmasked encrypted word, it is necessary to know the content of the registers 20 and 23 (R3), as well as that of at least one of the registers 21 or 22. Indeed, when the number of rounds performed is even, the unmasked encryption word is obtained by multiplying the content of the register 20 with the content of the register 23 and with the inverse of the content of the register 22. When the number of rounds performed is odd, the unmasked encryption word is obtained by multiplying the content of the register 20 with the inverse of the content of the registers 22 and 23.

One advantage of the described embodiments is that they make the algorithm resistant to second order side-channel attacks.

Another advantage of the described embodiments is that they do not depend on the polynomial P modulo which the bytes are multiplied.

Another advantage of the described embodiments comes from the fact that a single random value is generated at each round, which reduces the number of registers used during execution of the algorithm.

Another advantage of the described embodiments is that the inversion operation is protected.

Various embodiments and variants have been described. Those skilled in the art will understand that certain features of these embodiments can be combined and other variants will readily occur to those skilled in the art.

Finally, the practical implementation of the embodiments and variants described herein is within the capabilities of those skilled in the art based on the functional description provided hereinabove, in particular, concerning the block encryption algorithm type used, as well as the implementation of the cryptographic operations specific to the encryption algorithm.

One embodiment provides a method for protecting a first data item applied to a cryptographic algorithm, executed by a processor, in which said algorithm is a per-round algorithm, with each round processing contents of first, second and third registers, the content of the second register being masked by the fourth register content during first parity rounds, and the content of the third register being masked by the fifth register content during second parity rounds.

One embodiment provides for a processor implementing a per-round cryptographic algorithm configured to protect a first data item, with each round processing contents of first, second and third registers, the content of the second register being masked by the fourth register content during first parity rounds, and the third register content being masked by the fifth register content during second parity rounds.

According to one embodiment, the contents of the first, second and third registers for the first round are, respectively:
said first data item, masked by a first mask;
a second mask; and
the first mask, masked by a third mask.

According to one embodiment, the first register content following execution of the last round provides the result of applying the algorithm to the first data item.

According to one embodiment, for each first parity round, a fourth mask is generated by a random generator and is stored in the fourth register, and, for each second parity round, a fifth mask is generated by the generator and is stored in the fifth register.

According to one embodiment, for each round,
a) the first register content is inverted modulo a prime polynomial; then
b) the first register content is masked by the contents of the second and third registers.

According to one embodiment, for each round, following steps a) and b), cryptographic operations are performed on the content of the first register.

According to one embodiment, for each round, the inversion of the first register content is implemented by a threshold implementation by boxes.

According to one embodiment, the prime polynomial modulo, which the inverse of the first register content is calculated, depends on the algorithm implemented.

According to one embodiment, the first parity rounds are the rounds ranked odd and the rounds of second parity are the ranked even.

According to one embodiment, the first parity rounds are the rounds ranked even and the second parity rounds are the rounds ranked odd.

According to one embodiment, at the output of the last round, the first register contains a second data item, masked by a sixth mask.

According to one embodiment, the second data item corresponds to the first encrypted data.

According to one embodiment, the sixth mask is a combination of the third mask multiplied with the content of the second register or the inverse of the third mask with the content of the third register, depending on whether the last round is first or second parity.

According to one embodiment, the cryptographic algorithm used is AES.

According to one embodiment, the cryptographic algorithm used is SM4.

In an embodiment, a method comprises: executing, using cryptographic circuitry, a cryptographic operation; and protecting, using the cryptographic circuitry, a first data item applied to the cryptographic operation during the executing. The executing and protecting includes: executing the cryptographic operation in a plurality of rounds, each round processing contents of first, second and third registers; masking content of the second register using content of a fourth register during first parity rounds of the plurality of rounds; and masking content of the third register using content of a fifth register during second parity rounds of the plurality of rounds. In an embodiment, the contents of the first, second and third registers for a first round are, respectively: said first data, masked by a first mask; a second mask; and the first mask, masked by a third mask. In an embodiment, the content of the first register following execution of a last round provides a result of the application of the cryptographic operation to the first data item. In an embodiment, for each first parity round, a random fourth mask is generated and stored in the fourth register; and for each second parity round, a random fifth mask is generated and stored in the fifth register.

In an embodiment, for each round,
a) the first register content is inverted modulo a prime polynomial and the inverted content stored in the first register; then
b) the content of the first register is masked by the content of the second and third registers. In an embodiment, for each round, following steps a) and b), cryptographic operations are performed on the content of the first register. In an embodiment, for each round, a threshold S-box implementation is used to perform the inversion of the content of the first register. In an embodiment, the prime polynomial modulo depends on the cryptographic operation to be executed.

In an embodiment, the first parity rounds are rounds ranked odd and the second parity rounds are ranked even. In an embodiment, the first parity rounds are rounds ranked even and the second parity rounds are rounds ranked odd.

In an embodiment, at the output of a last round, the first register contains a second data item masked by a sixth mask. In an embodiment, the second data item corresponds to the first encrypted data.

In an embodiment, at the output of a last round, the first register contains a second data item masked by a sixth mask; and the sixth mask is a combination of the third mask multiplied with the content of the second register or a combination of the inverse of the third mask multiplied with the content of the third register, depending on whether the last round is of the first parity or is of the second parity.

In an embodiment, the cryptographic operation employs AES encryption.

In an embodiment, the cryptographic operation employs SM4 encryption.

In an embodiment, a device comprises: a plurality of registers; and cryptographic circuitry coupled to the plurality of registers, wherein the cryptographic circuitry, in operation: executes a cryptographic operation; and protects a first data item during the executing of the cryptographic operation. The executing and protecting includes: executing the cryptographic operation in a plurality of rounds, each round processing contents of first, second and third registers of the plurality of registers; masking content of the second register using content of a fourth register of the plurality of registers during first parity rounds of the plurality of rounds; and masking content of the third register using content of a fifth register of the plurality of registers during second parity rounds of the plurality of rounds. In an embodiment, the contents of the first, second and third registers for a first round of the plurality of rounds are, respectively: said first data, masked by a first mask; a second mask; and the first mask, masked by a third mask. In an embodiment, the content of the first register following execution of a last round of the plurality of rounds provides a result of the application of the cryptographic operation to the first data item. In an embodiment, the cryptographic circuitry comprises a random number generator, which, in operation, for each first parity round, generates a fourth mask which the cryptographic circuitry stores in the fourth register; and for each second parity round, generates a fifth mask which the cryptographic circuitry stores in the fifth register.

In an embodiment, for each round,
a) the first register content is inverted modulo a prime polynomial and the inverted content stored in the first register; then
b) the content of the first register is masked by the content of the second and third registers. In an embodiment, for each round, following steps a) and b), the cryptographic circuitry performs cryptographic operations on the content of the first register. In an embodiment, the cryptographic circuitry, in each round, uses a threshold S-box implementation to perform the inversion of the content of the first register. In an embodiment, the cryptographic circuitry, in operation, selects the prime polynomial modulo based on the cryptographic operation to be executed.

In an embodiment, the first parity rounds are rounds ranked odd and the second parity rounds are ranked even. In an embodiment, at the output of a last round of the plurality of rounds, the first register contains a second data item masked by a sixth mask. In an embodiment, the second data item corresponds to the first encrypted data.

In an embodiment, a system comprises: a memory; and cryptographic circuitry coupled to the memory and including a plurality of registers, wherein the cryptographic circuitry, in operation: executes a cryptographic operation; and protects a first data item during the executing of the cryptographic operation. The executing and protecting includes: executing the cryptographic operation in a plurality of rounds, each round processing contents of first, second and third registers of the plurality of registers; masking content of the second register using content of a fourth register of the plurality of registers during first parity rounds of the plurality of rounds; and masking content of the third register using content of a fifth register of the plurality of registers during second parity rounds of the plurality of rounds. In an embodiment, the cryptographic operation employs AES encryption. In an embodiment, the cryptographic operation employs SM4 encryption. In an embodiment, the system comprises an interface coupled to the cryptographic circuitry, wherein the interface, in operation, receives and transmits data.

In an embodiment, a non-transitory computer-readable medium has contents which cause cryptographic circuitry to perform a method, the method comprising: executing a cryptographic operation; and protecting a first data item during the executing of the cryptographic operation, wherein the executing and protecting includes: executing the cryptographic operation in a plurality of rounds, each round processing contents of first, second and third registers; masking content of the second register using content of a fourth register during first parity rounds of the plurality of rounds; and masking content of the third register using content of a fifth register during second parity rounds of the plurality of rounds. In an embodiment, the contents of the first, second and third registers for a first round are, respectively: said first data, masked by a first mask; a second mask; and the first mask, masked by a third mask. In an embodiment, the content of the first register following execution of a last round provides a result of application of the cryptographic operation to the first data item. In an embodiment, the contents of the non-transitory computer-readable medium comprise instructions executed by the cryptographic circuitry.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, security engines, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
executing, using cryptographic circuitry, a cryptographic operation; and
protecting, using the cryptographic circuitry, a first data item applied to the cryptographic operation during the executing, wherein the executing and protecting includes:
executing the cryptographic operation in a plurality of rounds, each round processing contents of first, second and third registers;
masking content of the second register using content of a fourth register during first parity rounds of the plurality of rounds; and
masking content of the third register using content of a fifth register during second parity rounds of the plurality of rounds.

2. The method according to claim 1, in which the contents of the first, second and third registers for a first round are, respectively:
said first data, masked by a first mask;
a second mask; and
the first mask, masked by a third mask.

3. The method according to claim 2, wherein,
for each first parity round, a random fourth mask is generated and stored in the fourth register; and
for each second parity round, a random fifth mask is generated and stored in the fifth register.

4. The method according to claim 3, wherein, at the output of a last round, the first register contains a second data item masked by a sixth mask.

5. The method according to claim 4, wherein the second data item corresponds to the first encrypted data.

6. The method according to claim 3, wherein,
at the output of a last round, the first register contains a second data item masked by a sixth mask; and
the sixth mask is a combination of the third mask multiplied with the content of the second register or a combination of the inverse of the third mask multiplied with the content of the third register, depending on whether the last round is of the first parity or is of the second parity.

7. The method according to claim 1, wherein the content of the first register following execution of a last round provides a result of the application of the cryptographic operation to the first data item.

8. The method according to claim 1, wherein, for each round,
a) the first register content is inverted modulo a prime polynomial and the inverted content stored in the first register; then
b) the content of the first register is masked by the content of the second and third registers.

9. The method according to claim 8, wherein, for each round, following steps a) and b), cryptographic operations are performed on the content of the first register.

10. The method according to claim 8, wherein, for each round, a threshold S-box implementation is used to perform the inversion of the content of the first register.

11. The method according to claim 8, wherein the prime polynomial modulo depends on the cryptographic operation to be executed.

12. The method according to claim 1, wherein the first parity rounds are rounds ranked odd and the second parity rounds are ranked even.

13. The method according to claim 1, wherein the first parity rounds are rounds ranked even and the second parity rounds are rounds ranked odd.

14. The method according to claim 1, wherein the cryptographic operation employs AES encryption.

15. The method according to claim 1, wherein the cryptographic operation employs SM4 encryption.

16. A device, comprising:
a plurality of registers; and
cryptographic circuitry coupled to the plurality of registers, wherein the cryptographic circuitry, in operation:
executes a cryptographic operation; and
protects a first data item during the executing of the cryptographic operation, wherein the executing and protecting includes:

executing the cryptographic operation in a plurality of rounds, each round processing contents of first, second and third registers of the plurality of registers;

masking content of the second register using content of a fourth register of the plurality of registers during first parity rounds of the plurality of rounds; and masking content of the third register using content of a fifth register of the plurality of registers during second parity rounds of the plurality of rounds.

17. The device of claim 16, wherein which the contents of the first, second and third registers for a first round of the plurality of rounds are, respectively:

said first data, masked by a first mask;

a second mask; and the first mask, masked by a third mask.

18. The device according to claim 17, wherein the cryptographic circuitry comprises a random number generator, which, in operation, for each first parity round, generates a fourth mask which the cryptographic circuitry stores in the fourth register; and for each second parity round, generates a fifth mask which the cryptographic circuitry stores in the fifth register.

19. The device according to claim 18, wherein, at the output of a last round of the plurality of rounds, the first register contains a second data item masked by a sixth mask.

20. The device according to claim 19, wherein the second data item corresponds to the first encrypted data.

21. The device according to claim 16, wherein the content of the first register following execution of a last round of the plurality of rounds provides a result of the application of the cryptographic operation to the first data item.

22. The device according to claim 16, wherein, for each round, a) the first register content is inverted modulo a prime polynomial and the inverted content stored in the first register; then b) the content of the first register is masked by the content of the second and third registers.

23. The device according to claim 22, wherein, for each round, following steps a) and b), the cryptographic circuitry performs cryptographic operations on the content of the first register.

24. The device according to claim 22, wherein the cryptographic circuitry, in each round, uses a threshold S-box implementation to perform the inversion of the content of the first register.

25. The device according to claim 22, wherein the cryptographic circuitry, in operation, selects the prime polynomial modulo based on the cryptographic operation to be executed.

26. The device according to claim 16, wherein the first parity rounds are rounds ranked odd and the second parity rounds are ranked even.

27. A system, comprising:

a memory; and cryptographic circuitry coupled to the memory and including a plurality of registers, wherein the cryptographic circuitry, in operation:

executes a cryptographic operation; and protects a first data item during the executing of the cryptographic operation, wherein the executing and protecting includes:

executing the cryptographic operation in a plurality of rounds, each round processing contents of first, second and third registers of the plurality of registers;

masking content of the second register using content of a fourth register of the plurality of registers during first parity rounds of the plurality of rounds; and masking content of the third register using content of a fifth register of the plurality of registers during second parity rounds of the plurality of rounds.

28. The system according to claim 27, wherein the cryptographic operation employs AES encryption.

29. The system according to claim 27, wherein the cryptographic operation employs SM4 encryption.

30. The system of claim 27, comprising an interface coupled to the cryptographic circuitry, wherein the interface, in operation, receives and transmits data.

31. A non-transitory computer-readable medium having contents which cause cryptographic circuitry to perform a method, the method comprising:

executing a cryptographic operation; and protecting a first data item during the executing of the cryptographic operation, wherein the executing and protecting includes:

executing the cryptographic operation in a plurality of rounds, each round processing contents of first, second and third registers;

masking content of the second register using content of a fourth register during first parity rounds of the plurality of rounds; and masking content of the third register using content of a fifth register during second parity rounds of the plurality of rounds.

32. The non-transitory computer-readable medium according to claim 31, in which the contents of the first, second and third registers for a first round are, respectively:

said first data, masked by a first mask;

a second mask; and the first mask, masked by a third mask.

33. The non-transitory computer-readable medium according to claim 31, wherein the content of the first register following execution of a last round provides a result of application of the cryptographic operation to the first data item.

34. The non-transitory computer-readable medium according to claim 31, wherein the contents of the non-transitory computer-readable medium comprise instructions executed by the cryptographic circuitry.

* * * * *